Aug. 13, 1935.　　E. G. SPERRY ET AL　　2,011,425
RAIL FLAW DETECTOR MECHANISM
Filed May 12, 1932　　2 Sheets-Sheet 1

INVENTORS
Edward G. Sperry
James A. Drain, Jr.
BY
Joseph N. Lifschutz
ATTORNEY

Aug. 13, 1935.  E. G. SPERRY ET AL  2,011,425
RAIL FLAW DETECTOR MECHANISM
Filed May 12, 1932   2 Sheets-Sheet 2
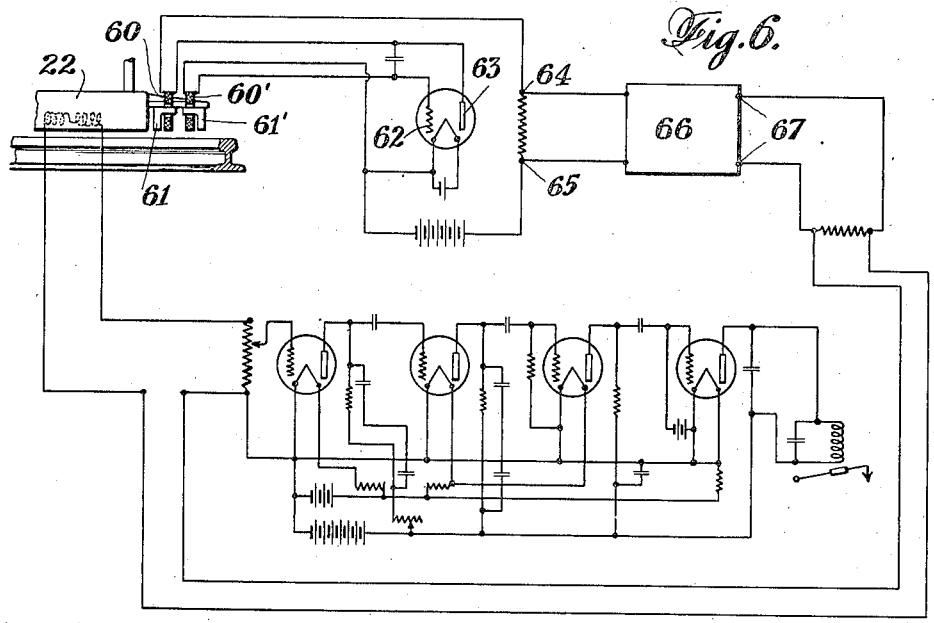
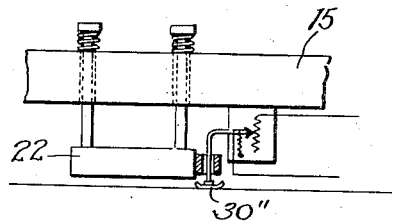
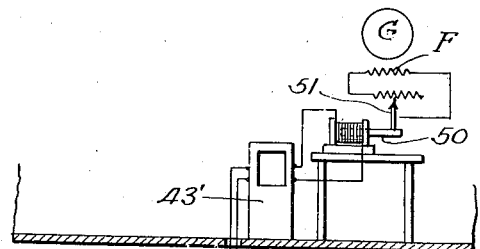
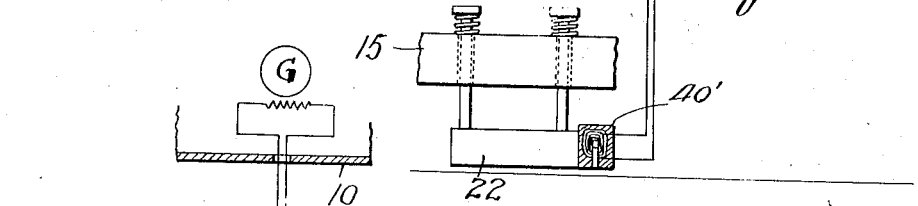
INVENTORS
Edward G. Sperry
James A. Infain, Jr.
BY Joseph H. Lipschutz
ATTORNEY Patented Aug. 13, 1935

2,011,425

UNITED STATES PATENT OFFICE 2,011,425

RAIL FLAW DETECTOR MECHANISM

Edward G. Sperry and James A. Drain, Jr., Brooklyn, N. Y., assignors to Sperry Products, Inc., Brooklyn, N. Y., a corporation of New York Application May 12, 1932, Serial No. 610,775

10 Claims. (Cl. 175—183)

This invention relates to mechanisms for detecting internal flaws in electrical conductors such as rails. The present method of detecting such flaws consists in passing a current of large amperage through the conductor in order to establish an electromagnetic field surrounding the same, and induction coils are then moved through this field in constant relation to the conductor to cut the lines of force and induce E. M. F.'s. The coils are usually arranged in opposed pairs in tandem so that variations in the source of current supply will have no effect upon the output of the detector mechanism, but a region of flaw which causes a displacement of the electromagnetic field will cause first one and then the other of these coils to cut a different number of lines of force than the other coil and thus generate the differential E. M. F. Said differential E. M. F. is then amplified and caused to operate an indicator such as a recorder.

The mechanism now employed includes a source of current carried within a car-body moving over the rails, said current being led into and out of the rail by means of sets of current brushes carried by a current brush carriage which is supported on wheels on said rail. The search unit, consisting of the above mentioned coils, is supported on this carriage.

It has been found that as the carriage followed the varying contour of the rail surface so that one end thereof rose or dipped with respect to the other end, the search unit carried thereby rose and fell correspondingly. Since the distance of the search unit above the rail is relatively small, usually only a few thirty-seconds clearance, such rising and falling of one end of the current brush carriage sometimes cause the search unit to touch the rail and at other times to enlarge the gap between the unit and the rail to such proportion as to cause said coils to operate in a substantially diminished electromagnetic field. As a result of such movements of the search unit it was found that the lowering of the search unit closer to the rail into a region of substantially greater flux caused the mechanism to pick up not only flaws but all sorts of false indications which were due to surface irregularities rather than to flaws; while the rising of the search unit into a region of diminished electromagnetic flux was the cause of missing some of the internal fissures.

It is the principal object of our invention, therefore, to provide means whereby the output of the search unit is maintained constant at all times, except when passing through the region of a flaw, in spite of any movements of one end of the current brush carriage with respect to the other end. Such normally constant output of the search unit may be obtained in various ways, such as (1) by varying the position of the coils with respect to the rail so as to counteract the displacement caused by rising and falling of one end of the detector carriage; (2) by varying the electromagnetic field corresponding to such rise and fall of one end of the detector carriage sufficient to counteract the effect of such rise and fall; and (3) varying the sensitivity of the amplifier inversely with the distance that the coils are raised or lowered with respect to the rail. In every case, however, the result is the same, namely, that the output of the induction coils is maintained normally constant.

Further objects and advantages of this invention will become apparent in the following detailed description thereof:

In the accompanying drawings,

Fig. 4 is a view similar to Figs. 2 and 3 showing another form of our invention wherein the output of the coils is normally maintained constant by varying the electromagnetic field surrounding the conductor.

Fig. 5 is a view similar to Figs. 2-4 inclusive, showing still another form of our invention for performing the same function as the device of Fig. 4.

Fig. 6 is a view similar to Figs. 2-5 inclusive, to which has been added a wiring diagram disclosing another form of our invention wherein the output of the coils is normally maintained constant by varying the sensitivity of the amplifying mechanism.

Fig. 7 is a view similar to Fig. 6 but showing mechanical means for performing the same function as the Fig. 6 form of the invention.

Figure 1:
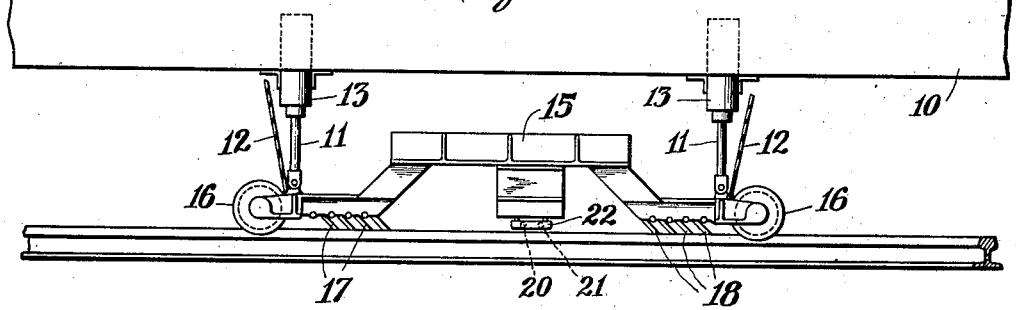
Fig. 1 is a side elevation of a portion of a rail flaw detector car showing one form of our invention applied thereto.

Referring first to Fig. 1 of the drawings, we have shown a rail flaw detector mechanism as mounted on a car-body 10, only a portion of which is shown. The said mechanism may be suspended from the car-body by means of pistons 11 and cables 12, the said pistons operating in fluid pressure cylinders 13 to which fluid pressure from a source not shown is supplied when it is desired to lower the mechanism into engagement with the rail, the said mechanism comprising a current brush carriage 15 having means such as wheels 16 for riding on the rail and having sets of current brushes 17, 18 for leading current into and out of the rail. Said current may be supplied from a generator (not shown) within the car body. Thus, an electromagnetic field is built up surrounding the conductor and through said field is adapted to be moved a plurality of induction coils such as 20, 21 within a housing 22 suspended from the current brush carriage 15. Said coils will normally cut a constant number of lines of force as the car moves along the rail to induce a constant E. M. F. The coils are usually opposed to each other so that normally the E. M. F. induced by one coil is equal and opposite to that induced in the other coil, so that no differential E. M. F. normally results. When, however, a region of flaw is entered one coil will enter said region before the other to cut a different number of lines of force and a differential E. M. F. will be generated. Said differential E. M. F. is then amplified by an amplifier, shown in Fig. 6, and the output from said amplifier is caused to operate a suitable indicator such as a recorder.

It will be seen that the wheels 16 forming the points of support of the current brush carriage 15 are spaced a substantial distance apart and will follow the surface contour of the rail. When said wheels ride into depressions or upon inclined portions of the rail surface, it will be seen that the search unit 22 in which the induction coils are housed will be lowered or raised correspondingly to vary the distance between said coils and the rail surface. Since the gap between the housing 22 and the rail surface is of very small dimensions, usually in the nature of 3/32", it will be seen that such rising and falling of the carriage may cause the gap to be reduced to such point as to cause said housing to engage the rail or may increase said gap to such point that the coils move through a region of substantially reduced flux. Thus, for example, if the leading wheel 16 should ride into a depression, it will be seen that housing 22 may very easily be lowered sufficiently to engage the rail, since said housing is carried by the carriage 15 one end of which has been lowered; similarly, in the case where the carriage is tilted upwardly. We therefore provide means for maintaining the output of the coils constant regardless of such movements of the carriage vertically with respect to the rail.

Figure 2:
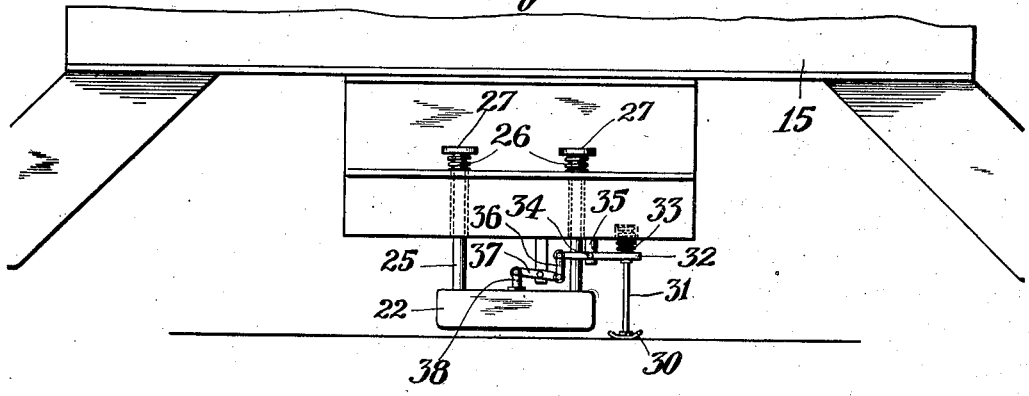
Fig. 2 is an enlarged view of one form of means for maintaining the output of the coils normally constant as shown in Fig. 1.

One form of our invention, whereby we are enabled to maintain a constant output of the induction coils in spite of any vertical movements of one or both ends of the carriage 15, is disclosed in Fig. 2. In this figure it will be seen that the search unit 22 is mounted in the current brush carriage frame 15 by means of bolts 25 which extend loosely therethrough. The housing 22 is maintained in a certain normal relation to the carriage by means of springs 26 engaging flanges 27 fixed on the bolts 25. Such normal positioning provides a predetermined gap between the base of the housing 22 and the rail surface when the carriage is riding on perfectly straight rail surface. When, however, one or both ends of the carriage ride into depressions or on to inclinations tending to carry the carriage 15 downwardly or upwardly with respect to the rail, and thus normally tending to carry the housing 22 downwardly or upwardly to vary the distance between the coils and the rail, we provide the following mechanism for maintaining such distance constant and therefore for maintaining the output of the coils constant. This mechanism may comprise a spring-pressed shoe in engagement with the rail surface, said shoe being carried by a link 31 fixed in one end of a lever 32, said end of the lever being pressed by a spring 33 so as normally to maintain shoe 30 in firm engagement with the rail. Said lever 32 is pivoted on bracket 35 on carriage 15. In order to keep the housing 22 a constant distance above the rail in spite of movements of the carriage 15, we have provided a parallel motion linkage between the said housing and the shoe 30 so that as the carriage rises and falls carrying bracket 35 and hence pivot 34 therewith, the lever 32 will be rocked around said pivot to actuate link 36, lever 37 and bracket 38 comprising a parallel motion linkage to move the housing 22 in the same direction as the shoe 30 with respect to the carriage.

Thus, assume that in the Fig. 2 form of the invention the rear end of the carriage has dropped into a declivity, which would normally carry the housing 22 downwardly into close proximity or even into position to rest upon the rail. With the linkage shown such downward movement of the carriage would cause upward movement of the right end of lever 32, downward movement of the left end of lever 32 and hence of link 36, downward movement of the right end of lever 37 and hence upward movement of the left end of lever 37 and bracket 38 to raise the housing 22 against the action of restoring springs 26. The linkage is such that the movement of housing 22 is exactly equal and opposite to the rising and falling movements of carriage 15.

Figure 3:
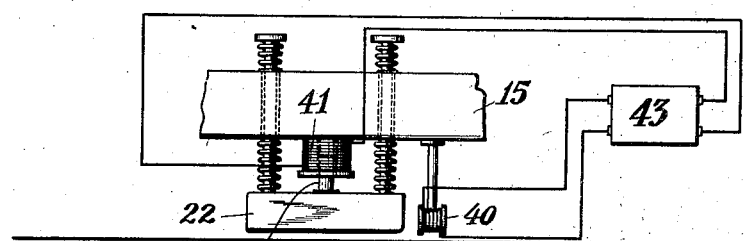
Fig. 3 is a view of a portion of the mechanism similar to Fig. 2 but showing a modified form of our invention for accomplishing the same purpose.

In Fig. 3, we have shown a means whereby we may accomplish electrically the same result as in the Fig. 2 form, that is, of moving the search unit 22 equally and oppositely to the vertical movements of the carriage 15. For this purpose we suspend from the carriage 15 an induction coil 40 which normally cuts a constant number of lines of force as the car moves along the rail, but which will cut a different number of lines of force if the carriage 15 rises or falls with respect to the rail surface. We cause the search unit 22 to be controlled from said coil 40, by means of a solenoid 41 which acts upon a core 42 fixed to the search unit 22 to raise or lower the same as the energization of coil 41 is increased or decreased. Such energization of coil 41 is controlled from the coil 40 by means of an amplifier 43 which amplifies the output of said coil 40 and the output of said amplifier energizes the coil 41. Variations in energization of said coil will move the core 42 inwardly or outwardly to raise or lower the search unit 22 equally and oppositely to the vertical movement of carriage 15 with respect to the rail. In this case, the search unit 22 may be mounted in the carriage in a manner similar to that shown in Fig. 2.

In Figs. 2 and 3, we have shown means for varying the air gap between the detector coils and the rail surface so as to counteract the effect of vertical movements of the current brush carriage which would normally tend to vary said gap because the search unit is carried by the current brush carriage. Thus, the output of said search unit is maintained constant in spite of the vertical movements of the current brush carriage. Still another method of maintaining a normal constant output of the detector coils in spite of the vertical movements of the current brush carriage is disclosed in Fig. 4. Here, the search unit 22 is fixedly mounted in the current brush carriage and no attempt is made to maintain the air gap constant but the electromagnetic field is varied as the carriage 15 moves the search unit up and down so that the coils always move in a substantially constant electromagnetic flux and therefore will have a substantially constant output. That is to say, as the carriage rises and tends to move the search unit into a region of less dense flux, the current through the rail is increased to increase the flux sufficiently to counteract the effect of such movement into a region of rarer flux. Similarly, when the carriage moves downwardly to tend to move the search unit into a region of denser flux, the current through the rail is decreased so as to decrease the strength of the voltage sufficient to counteract the downword movement. For this purpose, we have provided a shoe 30' similar to the shoe 30 of Fig. 2, but instead of being connected to the search unit in the manner shown in the latter figure, said shoe is caused to actuate the rheostat by any suitable means such as a link 50 pivotally connected to the rheostat arm 51 operating from a rheostat 52 in the circuit of the field of the generator which supplies current to the rails.

Just as the Fig. 2 form of the invention could be carried out electrically, as shown in Fig. 3, so the Fig. 4 form of the invention may be carried out electrically as disclosed in Fig. 5. A coil 40' similar to the coil 40 of Fig. 3, is carried by the carriage 15 and the vertical movements of the carriage 15 will vary the E. M. F. induced by said coil. Said E. M. F. may be amplified by an amplifier 43' and the output from said amplifier may act upon the link 50 and rheostat arm 51 as in the Fig. 4 form to accomplish the same result.

There is still another means for obtaining a constant output from the coils in spite of the movements of the current brush carriage vertically with respect to the rail. This means operates upon the principle of varying the sensitivity of the amplifier which is employed to amplify the output of the coils. Thus, when the coils are raised so that they operate in a region of rarer flux the amplifier may be made more sensitive to increase its amplification and thus maintain the output from the amplifier constant. Similarly, when the coils are moved downwardly by the carriage 15 into a region of denser flux so that the output of the coils is greater, the amplifier may be made less sensitive to reduce its amplification and in this manner also maintain the output constant. To accomplish this result, I have shown an oscillatory circuit which may comprise a pair of coils 60, 60' carried by the carriage 15 or the search unit 22, said coils having L-shaped laminated cores 61, 61' so that when said coils are magnetized there is a magnetic circuit through the laminated cores 61, 61' and the rail. As the gap between the cores 61, 61' and the rail is varied the reluctance of the magnetic circuit is changed and the flux through the circuit is changed. This change in flux is caused to change the output of said oscillatory circuit to change the bias which is impressed on the grid of the amplifier used for amplifying the output of the coils. The oscillatory circuit is shown as comprising a grid 62 connected to one of the magnets and a plate 63 connected to the other of the magnets, so that the output of the plate circuit goes into the magnetic circuit and is sent into the tube on the grid 62. An oscillation is thus established and this oscillatory circuit may be tapped as shown at 64, 65 to draw off the voltage therefrom which passes through a rectifying and amplifying means 66 so that a pure D. C. output is obtained at the output terminals 67. This D. C. output, therefore, will vary with the voltage obtaining in the oscillatory circuit as determined by the gap between the coils and the rail caused by vertical movements of the carriage 15. The said D. C. output may be impressed as a bias on the grid of one of the tubes to the amplifier set used for the purpose of amplifying the output of the search unit. If these variations are slight the said bias may be impressed on the grid of the first tube, as shown. But if a lesser multiplication of the variation induced by the movements of the carriage 15 is necessary, said bias may be impressed on one of the succeeding tubes, or even on the last tube. The output of the amplifier is thus varied equally and oppositely to the movements of the search unit into regions of greater or lesser flux sufficient to counteract the effect of such movements.

Another method of accomplishing the same result as in the Fig. 6 form of the invention, that is, of changing the bias impressed upon the grid of one of the tubes in accordance with the vertical movements of the current brush carriage, is disclosed in Fig. 7 wherein a shoe 30'' similar to the shoes 30 and 30' is utilized for the purpose of operating a rheostat which controls a voltage impressed upon said grid.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a flaw detector mechanism adapted to travel along rails and the like for detecting flaws therein, a current brush carriage, means for supplying current to the rail including a source of current and brushes carried by said carriage for leading current into and out of the rail, means responsive to variations in flux surrounding the rail, said responsive means being mounted on said carriage so as normally to partake of the vertical movements thereof tending to vary the relation between said responsive means and the electromagnetic field surrounding the rail, means for amplifying the output of said responsive means, and means for maintaining the output of said amplifying means, in response to a given flaw, normally constant for all vertical movements of said responsive means.

2. In a flaw detector mechanism adapted to travel along rails and the like for detecting flaws therein, a current brush carriage, means for supplying current to the rail including a source of current and brushes carried by said carriage for leading current into and out of the rail, means responsive to variations in flux surrounding the rail, a support for said responsive means, said support being mounted on said carriage out of engagement with the rail and so as normally to partake of the vertical movements thereof tending to vary the relation between said responsive means and the electromagnetic field surrounding the rail, and means for maintaining the output of said responsive means, in response to a given flaw, normally constant for all vertical movements of said responsive means.

3. In a flaw detector mechanism adapted to travel along rails and the like for detecting flaws therein, a current brush carriage, means for supplying current to the rail including a source of current and brushes carried by said carriage for leading current into and out of the rail, means responsive to variations in flux surrounding the rail, a support for said responsive means, said support being mounted on said carriage out of engagement with the rail and so as normally to partake of the vertical movements thereof tending to vary the relation between said responsive means and the electromagnetic field surrounding the rail, and means for controlling said responsive means to counteract the effect of said vertical movements.

4. In a flaw detector mechanism adapted to travel along rails and the like for detecting flaws therein, a current brush carriage, means for supplying current to the rail including a source of current and brushes carried by said carriage for leading current into and out of the rail, means responsive to variations in flux surrounding the rail, said responsive means being mounted on said carriage so as normally to partake of the vertical movements thereof tending to vary the relation between said responsive means and the electromagnetic field surrounding the rail, and means for controlling the current supply means for varying the current through the rail to counteract the effect of said vertical movements.

5. In a flaw detector mechanism adapted to travel along rails and the like for detecting flaws therein, a current brush carriage, means for supplying current to the rail including a source of current and brushes carried by said carriage for leading current into and out of the rail, means responsive to variations in flux surrounding the rail, said responsive means being mounted on said carriage so as normally to partake of the vertical movements thereof tending to vary the relation between said responsive means and the electromagnetic field surrounding the rail, means responsive to the vertical movements of said carriage and means controlled by said vertical-movement-responsive means for varying the current through the rail to counteract the effect of said vertical movements.

6. In a flaw detector mechanism adapted to travel along rails and the like for detecting flaws therein, a current brush carriage, means for supplying current to the rail including a source of current and brushes carried by said carriage for leading current into and out of the rail, means responsive to variations in flux surrounding the rail, said responsive means being mounted on said carriage so as normally to partake of the vertical movements thereof but permitting relative movement between said carriage and said responsive means, said vertical movements tending to vary the relation between said responsive means and the electromagnetic field surrounding the rail and means for moving the said flux-responsive means in a direction equal and opposite to said vertical movements of the carriage.

7. In a flaw detector mechanism adapted to travel along rails and the like for detecting flaws therein, a current brush carriage, means for supplying current to the rail including a source of current and brushes carried by said carriage for leading current into and out of the rail, means responsive to variations in flux surrounding the rail, said responsive means being mounted on said carriage so as normally to partake of the vertical movements thereof but permitting relative movement between said carriage and said responsive means, said vertical movements tending to vary the relation between said responsive means and the electromagnetic field surrounding the rail, means responsive to the vertical movements of said carriage, and means controlled by said vertical-movement-responsive means for moving said flux-responsive means in a direction equal and opposite to said vertical movements of the carriage.

8. In a flaw detector mechanism adapted to travel along rails and the like for detecting flaws therein, a current brush carriage, means for supplying current to the rail including a source of current and brushes carried by said carriage for leading current into and out of the rail, means responsive to variations in flux surrounding the rail, said responsive means being mounted on said carriage so as normally to partake of the vertical movements thereof tending to vary the relation between said responsive means and the electromagnetic field surrounding the rail, means for amplifying the output of said responsive means, and means for controlling the sensitivity of said amplifying means to counteract the effects of said vertical movements.

9. In a flaw detector mechanism adapted to travel along rails and the like for detecting flaws therein, a current brush carriage, means for supplying current to the rail including a source of current and brushes carried by said carriage for leading current into and out of the rail, means responsive to variations in flux surrounding the rail, said responsive means being mounted on said carriage so as normally to partake of the vertical movements thereof tending to vary the relation between said responsive means and the electromagnetic field surrounding the rail, means for amplifying the output of said responsive means, means responsive to the vertical movements of said carriage, and means controlled by said vertical-movements-responsive means for varying the sensitivity of said amplifying means to counteract the effects of said vertical movements.

10. In a flaw detector mechanism adapted to travel along rails and the like for detecting flaws therein, a current brush carriage, means for supplying current to the rail including a source of current and brushes carried by said carriage for leading current into and out of the rail, means responsive to variations in flux surrounding the rail, a support for said responsive means, said support being mounted on said carriage out of engagement with the rail and so as normally to partake of the vertical movements thereof, means responsive to the vertical movements of said support relative to the rail, and means whereby said last-named responsive means maintains the output of said first responsive means, in response to a given flaw, normally constant for all vertical movements of said support.

EDWARD G. SPERRY.
JAMES A. DRAIN, Jr.